US009762414B2

United States Patent
Lopez de Victoria

(10) Patent No.: US 9,762,414 B2
(45) Date of Patent: *Sep. 12, 2017

(54) LEAST SQUARES CHANNEL IDENTIFICATION FOR OFDM SYSTEMS

(71) Applicant: Acorn Technologies, Inc., Santa Monica, CA (US)

(72) Inventor: Fernando Lopez de Victoria, San Francisco, CA (US)

(73) Assignee: ACORN TECHNOLOGIES, INC., La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/276,857

(22) Filed: May 13, 2014

(65) Prior Publication Data

US 2015/0333933 A1  Nov. 19, 2015
US 2016/0234042 A9  Aug. 11, 2016

Related U.S. Application Data

(63) Continuation of application No. 12/365,805, filed on Feb. 4, 2009, now Pat. No. 8,761,274.

(51) Int. Cl.
*H03D 1/00* (2006.01)
*H04L 27/06* (2006.01)
(Continued)

(52) U.S. Cl.
CPC ........ *H04L 25/0212* (2013.01); *H04L 25/021* (2013.01); *H04L 25/025* (2013.01);
(Continued)

(58) Field of Classification Search
CPC .................................................. H04L 25/0212
(Continued)

(56) References Cited

U.S. PATENT DOCUMENTS 6,219,334 B1   4/2001   Sato et al.
7,039,136 B2   5/2006   Olson et al.
(Continued)

FOREIGN PATENT DOCUMENTS

CN   101127753 A   2/2008
EP   1 530 333      5/2005
(Continued)

OTHER PUBLICATIONS

Abari, et al., "Low complexity channel estimation for LTE in fast fading environments for implementation on multi-standard platforms," IEEE, Vehicular Technology Conference, Sep. 6-9, 2010, pp. 1-5.

(Continued)

*Primary Examiner* — Fabricio R Murillo Garcia
(74) *Attorney, Agent, or Firm* — William H. Wright

(57) ABSTRACT

An OFDM system generates a channel estimate in the time domain for use in either a frequency domain equalizer or in a time domain equalizer. Preferably channel estimation is accomplished in the time domain using a locally generated reference signal. The channel estimator generates an initial estimate from a cross correlation between the time domain reference signal and an input signal input to the receiver and generates at least one successive channel estimate. Preferably the successive channel estimate is determined by vector addition (or subtraction) to the initial channel estimate. The at least one successive channel estimate reduces the minimum mean square error of the estimate with respect to a received signal.

22 Claims, 13 Drawing Sheets

(51) Int. Cl.
*H04L 25/02* (2006.01)
*H04L 25/03* (2006.01)

(52) U.S. Cl.
CPC ...... *H04L 25/0224* (2013.01); *H04L 25/0232* (2013.01); *H04L 25/03159* (2013.01); *H04L 2025/03713* (2013.01)

(58) Field of Classification Search
USPC .......................................................... 375/343
See application file for complete search history.

(56) References Cited

U.S. PATENT DOCUMENTS

| | | | |
|---|---|---|---|
| 7,099,270 | B2 | 8/2006 | Yamaguchi |
| 7,289,049 | B1 | 10/2007 | Fudge et al. |
| 7,394,876 | B2 | 7/2008 | Sestok, IV et al. |
| 7,787,572 | B2 | 8/2010 | Scharf et al. |
| 2004/0219883 | A1 | 11/2004 | Pauli et al. |
| 2005/0075845 | A1 | 4/2005 | Thomas et al. |
| 2005/0141657 | A1 | 6/2005 | Maltsev et al. |
| 2005/0147026 | A1 | 7/2005 | Jones, IV et al. |
| 2005/0176436 | A1* | 8/2005 | Mantravadi ........... H04L 25/022 455/450 |
| 2005/0180364 | A1 | 8/2005 | Nagarajan et al. |
| 2006/0029279 | A1 | 2/2006 | Donoho |
| 2006/0133529 | A1* | 6/2006 | Lee et al. ....................... 375/260 |
| 2006/0153283 | A1 | 7/2006 | Scharf et al. |
| 2006/0203932 | A1* | 9/2006 | Palanki et al. ................. 375/295 |
| 2006/0291578 | A1 | 12/2006 | Singh et al. |
| 2007/0110201 | A1* | 5/2007 | Mergen ............... H04L 25/0212 375/350 |
| 2007/0133393 | A1* | 6/2007 | Bocquet ............... H04L 25/022 370/210 |
| 2008/0063040 | A1* | 3/2008 | Akahori .............. H04L 25/0224 375/232 |
| 2008/0117995 | A1 | 5/2008 | Anderson et al. |
| 2008/0130771 | A1 | 6/2008 | Fechtel et al. |
| 2008/0151989 | A1 | 6/2008 | Von Elbwart et al. |
| 2008/0187034 | A1* | 8/2008 | Liang ................ H04L 25/03057 375/232 |
| 2008/0228446 | A1 | 9/2008 | Baraniuk et al. |
| 2008/0291893 | A1* | 11/2008 | Yang et al. .................... 370/350 |
| 2009/0296845 | A1* | 12/2009 | Alexander et al. ........... 375/267 |
| 2010/0002788 | A1 | 1/2010 | Wu et al. |
| 2010/0272194 | A1 | 10/2010 | Zhengang et al. |
| 2010/0284478 | A1 | 11/2010 | Liao et al. |
| 2011/0069796 | A1 | 3/2011 | Scharf et al. |
| 2011/0096767 | A1 | 4/2011 | Narayan et al. |
| 2011/0122789 | A1 | 5/2011 | Haustein et al. |
| 2011/0142118 | A1 | 6/2011 | Seo et al. |

FOREIGN PATENT DOCUMENTS

| | | |
|---|---|---|
| JP | 2007-515899 | 6/2007 |
| JP | 2008-536359 | 9/2008 |
| JP | 2009-081535 | 4/2009 |
| WO | WO 2007/095697 | 8/2007 |
| WO | WO 2008/136184 | 11/2008 |
| WO | WO 2010/020433 | 4/2010 |

OTHER PUBLICATIONS

Berger, et al., "Sparse Channel Estimation for Multicarrier Underwater Acoustic Communication: From Subspace Methods to Compressed Sensing," IEEE, Signal Processing, Mar. 2010, pp. 1708-1721, vol. 58, Issue 3.
Berger, et al., "Sparse Channel Estimation for OFDM: Over-Complete Dictionaries and Super-Resolution," IEEE Signal Processing Advances in Wireless Communications, 2009, Jun. 21-24, 2009, pp. 196-200.
Blumensath, et al. "Gradient Pursuits," IEEE, Signal Processing, Jun. 2008, pp. 2370-2382, vol. 56, Issue 6.
Budiarjo, et al., "On the Use of Virtual Pilots with Decision Directed Method in OFDM Based Cognitive Radio Channel Estimation Using 2x1-D Wiener Filter," IEEE, Communications, May 19-23, 2008, pp. 703-707.
Candes, "Compressive sampling," Proceedings of the International Congress of Mathematicians, 2006, pp. 1-20, Madrid, Spain.
De Baynast, et al., "Chip-level LMMSE Equalization for Downlink MIMO CDMA in Fast Fading Environments," IEEE Global Telecommunications Conference, Nov. 29-Dec. 3, 2004, pp. 2552-2556, vol. 4.
Doukopoulos et al., "Robust Channel Estimation via FFT Interpolation for Multicarrier Systems," IEEE Xplore Digital Library, Vehicular Technology Conference, 2007, VTC2007—Spring, IEEE 6th, Publication Date: Apr. 22-25, 2007, pp. 1861-1865, ISSN: 1550-2252, ISBN: 1-4244-0266-2, INSPEC Accession No. 9517667, DOI: 10.1109/VETECS.2007.386, Posted Online. May 29, 2007 14:52:54.0.
Edfors, et al. "Analysis of DFT-Based Channel Estimators for OFDM," Wireless Personal Communications, 2000, pp. 55-70, vol. 12.
Edfors, et al., "OFDM Channel Estimation by Singular Value Decomposition," IEEE Communications, Jul. 1998, pp. 931-939, vol. 46, Issue 7.
Fornasier, et al., "Compressive Sensing," Apr. 18, 2010, pp. 1-49.
Haimovich, et al. "An Eigenanalysis Interference Canceler," Jan. 1991, vol. 39, No. 1.
Hoeher, et al., "Two-Dimensional Pilot-Symbol-Aided Channel Estimation by Wiener Filtering," IEEE, Acoustics, Speech, and Signal Processing, Apr. 21-24, 1997, pp. 1845-1848, vol. 3.
Huang, et al., "Kalman-filter-based channel estimation for orthogonal frequency-division multiplexing systems in time-varying channels," IET, Communications, Aug. 2007, pp. 795-801, vol. 1, Issue 4.
Kang et al., "Efficient DFT-based channel estimation for OFDM systems on multipath channels," The Institute of Engineering and Technology Commun., Apr. 2007, pp. 197-202, vol. 1, No. 2.
Kinjo, "Time domain channel estimation schemes for OFDM systems with multiple antenna transmissions", 2009 International Symposium on Intelligent Signal Processing and Communication Systems (ISPACS 2009) Dec. 7-9, 2009, pp. 232-235.
Le Saux, et al., "Robust Time Domain Channel Estimation for Mimo-OFDMA Downlink System," Springer.com, Proceedings from the 6th International Workshop on Multi-Carrier Spread Spectrum, May 2007, Herrsching, Germany, Series: Lecture Notes in Electrical Engineering, vol. 1, Plass, S.; Dammann, A.; Kaiser, S.; Fazel, K. (Eds.) 2007, X, 106 p. Hardcover, ISBN: 978-1-4020-6128-8.
Maechler, et al., "Implementation of Greedy Algorithms for LTE Sparse Channel Estimation" Signals, Systems and Computers (ASILOMAR), Nov. 7-10, 2010, pp. 400-405.
Maechler, et al., "Matching Pursuit: Evaluation and Implementation for LTE Channel Estimation," IEEE, Circuits and Systems (ISCAS), May 30-Jun. 2, 2010, pp. 589-592.
Mallat, et al., "Matching Pursuits With Time-Frequency Dictionaries," IEEE, Signal Processing, Dec. 1993, pp. 3397-3415, vol. 41, Issue 12.
Özbek, et al., "Pilot-Symbol-Aided Iterative Channel Estimation for OFDM-Based Systems," 2008, Internet Publication.
Ozdemir, et al. "Channel Estimation for Wireless OFDM Systems," IEEE Communications, 2007, pp. 18-48, vol. 9, No. 2.
Pati, et al., "Orthogonal Matching Pursuit: Recursive Function Approximation with Applications to Wavelet Decomposition," Signals, Systems and Computers, Nov. 1-3, 1993, pp. 40-44, vol. 1.
Rinne, et al., "Pilot Spacing in Orthogonal Frequency Division Multiplexing Systems on Practical Channels," IEEE, Consumer Electronics, Nov. 1996, pp. 959-962, vol. 42, Issue 4.
Saeed M. A. et al: "MIMO OFDM Channel Estimation Based on RLS Algorithm: The Time-Versus Frequency-Domain Implementations" Communications, 2007. APCC 2007. Asia-Pacific Conference on, IEEE, PI LNKD-DOI:10.1109/APCC.2007.4433546, Oct. 1, 2007, pp. 547-550.

(56) References Cited

OTHER PUBLICATIONS

Schafhuber, et al., "Adaptive Wiener Filters for Time-Varying Channel Estimation in Wireless OFDM Systems," IEEE, Acoustics, Speech and Signal Processing, Apr. 6-10, 2003, pp. 688-691, vol. 4.
Tauböck, et al., "A Compressed Sensing Technique for OFDM Channel Estimation in Mobile Environments: Exploiting Channel Sparsity For Reducing Pilots," IEEE, Acoustics, Speech and Signal Processing, Mar. 31-Apr. 4, 2008, pp. 2885-2888.
Van De Beek, et al. "On Channel Estimation in OFDM Systems," Vehicular Technology Conference, Jul. 25-27, 1995, pp. 815-819, vol. 2.
Wan, et al., "The Modified Iterative Detector/Estimator Algorithm for Sparse Channel Estimation," OCEANS 2010, Sep. 20-23, 2010, pp. 1-6.
Wang, et al., "A New Channel Estimation Method Based on Distributed Compressed Sensing," IEEE, Wireless Communications and Networking Conference, Apr. 18-21, 2010, pp. 1-4.
Wu, et al., "Channel Estimation for OFDM Systems with Subspace Pursuit Algorithm," ICGCS, Green Circuits and Systems, Jun. 21-23, 2010, pp. 269-272.
Yücek et al., "A Comparative Study of Initial Downlink Channel Estimation Algorithms for Mobile WiMAX," IEEE Xplore Digital Library, Mar. 25-29, 2007, pp. 32-37, Digital Object Identifier: 10.1109/WIMAX.2007.348698.
Zhao, et al., "A Novel Channel Estimation Method for OFDM Mobile Communication Based on Pilot Signals and Transform-Domain Processing," IEEE $47^{th}$ Vehicular Technology Conference, May 4-7, 1997, pp. 2089-2093, vol. 3.

\* cited by examiner

US 9,762,414 B2

LEAST SQUARES CHANNEL IDENTIFICATION FOR OFDM SYSTEMS

This application is a continuation of U.S. application Ser. No. 12/365,805, filed Feb. 4, 2009, entitled, "Least Squares Channel Identification for OFDM Systems," which is incorporated by reference in its entirety.

BACKGROUND

1. Field of the Invention

The present invention relates to communication systems and, more particularly, to channel estimation in communication systems such as orthogonal frequency domain multiplexing or other systems that rely on channel estimation.

2. Description of the Related Art

Orthogonal frequency domain multiplexing (OFDM) is a common modulation strategy for a variety of commercially significant systems, including for digital subscriber line (DSL) communication systems and a number of implementations of the various IEEE 802.xx standards for wireless communication systems. Often, an OFDM receiver will perform one or more functions that require channel estimation to allow the receiver to acquire a signal and to improve signal quality before the receiver begins extracting bits.

OFDM receivers generally need to obtain signal timing information from a received signal to help identify the start of a symbol within the received signal. A symbol is a predetermined number $N_b$ of bits uniquely mapped into a waveform over a predetermined, finite interval or duration. Each possible collection of bits is mapped to a unique signal according to the mapping or modulation strategy dictated by the OFDM scheme. Once an OFDM receiver determines when a symbol begins within the received signal, the receiver performs additional processing to improve the quality of the received signal. In the processing to improve signal quality, the receiver attempts to achieve a target bit error rate (BER), often by implementing a linear filter, or equalizer, to condition the input signal. The received signal can be significantly distorted by channel imperfections. Ideally, the equalizer corrects the distortions introduced by the channel completely so that the receiver can demodulate the signal with performance limited only by the noise level.

OFDM, unlike most other modulation strategies commonly used in communication systems, can include two equalizers to improve signal quality: a time equalizer (TEQ) and a frequency equalizer (FEQ). Some OFDM applications such as DSL include a time equalizer while others, such as systems that implement current wireless standards, do not demand a time equalizer. All practical OFDM receivers have a frequency equalizer. Whether a receiver includes a time equalizer or only a frequency equalizer, the receiver needs to perform channel estimation to at least initially determine values of the equalizer coefficients before the equalizer can be used to improve the signal quality. Determining the coefficients for frequency equalizers is typically performed in the frequency domain.

Conventional OFDM receiver circuitry down converts the received signal to baseband and then analog-to-digital converts that signal to produce the information signal s(n) that is input into the OFDM processing circuitry shown in FIG. 11. The signal s(n) is input 1101 to a first processing element 1110 that removes the cycle prefix (CP) from the signal s(n). A conventional OFDM transmitter adds a CP of length $N_{CP}$, which consists of the last $N_{CP}$ samples, to a unique signal waveform of length N so that the digital signal that the transmitter converts to analog is of length $N+N_{CP}$. The initial step of the receiver's reverse conversion process then is to remove and discard the added cycle prefix $N_{CP}$ samples. Following that step, a serial to parallel conversion element 1120 organizes and converts the serial signal into parallel for further processing. The cycle prefix can be removed either before or after the serial to parallel conversion.

The parallel data output from the element 1120 is provided to a fast Fourier transform (FFT) processor 1130 that converts the time domain samples s(n) to a set of frequency domain samples $R_f(k)$ for processing. The received OFDM signals are assumed to be corrupted by the channel, which is assumed for OFDM to introduce amplitude and phase distortion to the samples from each of the frequencies used in the OFDM system. The FEQ 1150 applies an amplitude and phase correction specific to each of the frequencies used in the OFDM system to the various samples transmitted on the different frequencies. To determine the correction to be applied by the FEQ 1150, the FEQ 1150 needs an estimate of the channel's amplitude and phase variations from ideal at each frequency. In FIG. 11, the frequency domain channel estimate 1140 element determines the channel estimate that is used by the FEQ 1150.

A conventional OFDM channel estimator 1140 used in FIG. 11 typically uses a pilot tone sequence or other signal that has predictable characteristics such as known bits and carrier locations. The pilot tones are generally dictated by the relevant standards. The frequency equalizer 1150 receives the signals from the fast Fourier transform processor 1130 and the channel estimates from the estimator 1140 and equalizes the signal. The output of the equalizer 1150 is provided to a parallel to serial element 1160 that converts the parallel outputs of the equalizer to a serial signal that is then provided to the demodulator 1170. The structure and function of the demodulator varies and generally corresponds to a standard or particular OFDM communication scheme.

In many applications, there is a requirement to model an unknown system or process with a transfer function. The transfer function takes the form of either an infinite impulse response (IIR) or a finite impulse response (FIR) polynomial or filter. The former is also referred to as an auto-regressive moving average (ARMA) model and the latter simply as a moving average (MA) model.

The process of system identification or, equivalently, characterization, can typically be described as shown in FIG. 1. The input 101 to the unknown system 110 and the output 112 are used by the identification process to determine the ARMA or MA models. Modern identification methods are digitally implemented, so the signals s 101 and y 112 are assumed to be sampled, without a loss of generality on the methods' applicability and performance. From linear system theory, the relationship between the input and output signals is simply defined as a convolution, that is, $$y[n] = \sum_{l=-\infty}^{+\infty} h[l]s[n-l]. \quad (1)$$

Therefore, if the samples of the input signal s 101 are known and the unknown system's output signal y 112 samples are measured, the linear estimation of the unknown system can be achieved though various strategies.

The signals s 101 and y 102 are better described in a sampled system by adding the sampling index n which maps the value of each signal sample to an interval of time. The modeled unknown system response h[l] has the same sampling interval as the signals s[n] and y[n]. The discussions here assume that input and output signals are sampled at the same sampling interval. Variations on these assumptions do not affect performance of presently preferred implementations of the present invention.

The simplest strategy to identify an unknown system is to use an input signal for system identification that is s[0]=1, s[n]=0 for values of n≠0, and ranging between −∞ and +∞. This impulse response is termed a Dirac delta function and it has the desired effect in equation (1) of y[n]=h[n]. However, in most practical systems, using a Dirac delta function for system identification is not possible due to the practical difficulty in generating such an input signal, combined with hindering operational conditions such as the typical throughput rates in communication systems.

Since the right side of equation (1) is a dot-product definition, the output 112 is observed over N samples and the MA time span of h[l] is assumed to not be significant beyond L samples, then a matrix formulation of equation (1) is readily obtained:

$$y = Hs = Sh \quad (2)$$

where the N-by-L matrix H(S) has rows with the time-shifted samples, as a function of n, and the vector L-by-1 s(h) is fixed over the time span in y. That is, the entries in the vector y are $$y[m] = [y[n]y[n+1] \ldots y[n+N+1]]^T \quad (3).$$

The time index m is used to denote the possibility that the time-series of the vector y may not have a one-to-one correspondence with the input samples y. On the other hand, the index m in an OFDM system does have a one-to-one correspondence with the received OFDM symbol, defined as the time interval containing N=FFT length+cycle prefix samples. For example, in the WiMAX standard, this value can be N=1024+128=1152 samples.

Linear algebra notation is used to describe the operations due to its succinct representation and due to its immediate parallel to a hardware multiply-and-accumulate operation that performs a dot-product between two vectors, or the multiplication of a matrix row and a vector, as in equation (2). Those skilled in the art generally also exploit symmetric properties in the matrix to reduce complexity in this matrix-vector multiplication.

SUMMARY OF THE PREFERRED EMBODIMENTS

An aspect of the present invention provides a receiver, comprising a reference signal generator that generates a time domain reference signal responsive to a received frequency domain pilot signal. The receiver includes a channel estimator responsive to the time domain reference signal and generating a time domain channel estimate.

Another aspect of the present invention provides a receiver, comprising a reference signal generator that generates a local reference signal responsive to a received frequency domain pilot signal extracted from an input signal. The receiver includes a channel estimator responsive to the local reference signal and the input signal. The channel estimator generates an initial channel estimate from a cross-correlation based on the local reference signal and the input signal. A correction module generates a channel correction to the initial channel estimate. The correction module is responsive to the initial channel estimate to generate a set of basis filters and to generate the channel correction as a combination of the set of basis filters and a set of coordinates defined in the set of basis filters. A channel module adds the initial channel estimate with the channel correction and generates a further channel estimate.

Still another aspect of the present invention provides a frequency domain receiver for a communications system, the receiver comprising a reference signal generator that generates a time domain local reference signal. A channel estimator responsive to the local reference signal and the input signal generates a time domain initial channel estimate from a cross-correlation based on the local reference signal and an input signal. A correction module generates a channel correction to the initial channel estimate. The correction module responsive to the initial channel estimate to generate a set of basis vectors and to generate the channel correction as a combination of the set of basis vectors and a set of coordinates defined in the set of basis vectors. A channel module that adds the initial channel estimate with the channel correction and generates a time domain further channel estimate, wherein the further channel estimate is a minimum error channel estimate in a least squares sense. A filter module that generates a signal filter based on the further channel estimate and filters the input signal.

BRIEF DESCRIPTION OF THE DRAWINGS

Aspects of the present invention are illustrated in the attached drawings and can be better understood by reference to those drawings in conjunction with the detailed description. The attached drawings form a part of the disclosure.

DETAILED DESCRIPTION OF THE PREFERRED EMBODIMENTS

A preferred aspect of the present invention provides a channel estimate for use in either a frequency domain equalizer or in a time domain equalizer. Preferably channel estimation is accomplished by generating an initial channel estimate. For example, a channel estimator may generate an initial channel estimate from a cross correlation between a locally generated reference signal and a received signal input to the receiver. Preferably the channel estimator generates at least one successive channel estimate by determining a correction to the initial channel estimate where the correction is made by vector addition to the initial channel estimate. The at least one successive channel estimate preferably reduces the minimum mean square error of the estimate with respect to a received signal.

In particularly preferred implementations, the successive channel estimate is determined by generating a set of basis vectors, separately generating a set of coordinates with reference to that set of basis vectors, combining the set of basis vectors and the set of coordinates to generate a channel correction vector and adding the channel correction vector to the initial channel estimate to generate the successive channel estimate.

Another aspect of the present invention provides a communication system that generates a channel estimate in the time domain. Preferred implementations of this aspect estimate one or more channels in the time domain using a locally generated reference signal. The channel estimator generates an initial estimate from a cross correlation between the time domain reference signal and an input signal input to the receiver and generates at least one successive channel estimate. Preferably, at least one successive channel estimate reduces the minimum mean square error of the estimate with respect to a received signal. This time domain channel estimation strategy is implemented advantageously with respect to various communication systems including, for example, OFDM systems such as WiMAX systems.

Figure 1:
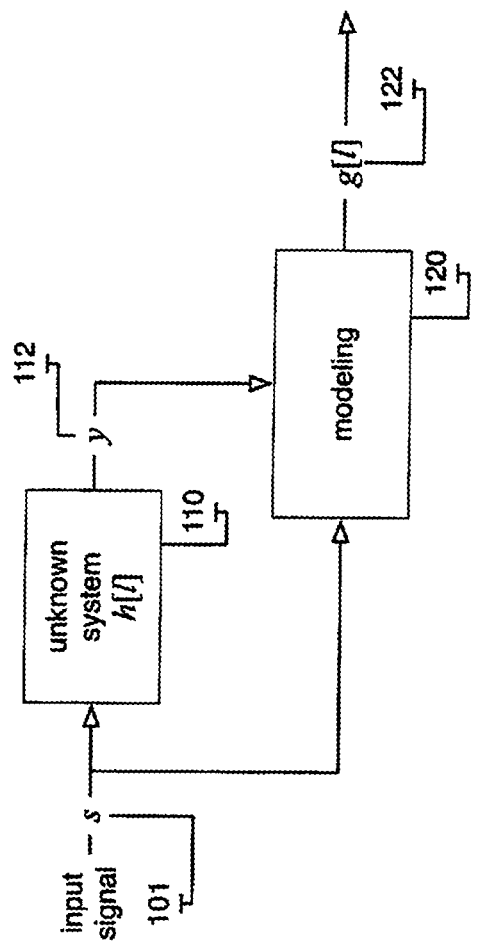
FIG. 1 schematically illustrates the general problem of determining channel characteristics based on information known about the signal before it is transmitted through the channel and information measured about the signal after it has passed through the channel.

The fundamental problem of channel estimation for a communication system is shown FIG. 1, where the channel is represented as an unknown linear transfer function and is to be identified by its impulse response. Typically, though not exclusively, a linear system is assumed to have a finite impulse response (FIR), or moving average model, which is a suitable assumption for many practical communication applications. In this example, the impulse response h[l] is to be determined solely through observations of the input s 101 and output y 112 signals. The estimate of h[l] 110, noted as g[l] 122, is determined from the two observed signals s 101 and y 112.

Using statistical signal analysis, the relationship between the sampled input s[n] and the sampled output y[n] from a given filter h[l] is $$r_{sy}[d] = \sum_{l=-\infty}^{+\infty} h^*[l] r_s[d-l], \quad (4)$$

where, for the signals typical of communication systems, $$r_s[d] = E\{s^*[d]s[n+d]\}$$

$$r_{sy}[d] = E\{s[d]y^*[n+d]\} \quad (5).$$

Equation (5) indicates that the unknown system's impulse response can be obtained from the cross-correlation $r_{sy}[d]$ between the input signal s[n] and the output signal y[n]. If $r_s[d]$ is ideally a "spike" consisting of a 1 at the delay d=0 and zero for d≠0, $r_s[0]$=1 and zero otherwise (that is, an ideal Dirac delta function), the cross-correlation between the unknown system output y[n] and the input s[n] reveals the impulse response h[l] for the values of n=d. Define g[l] as follows, $$g[l] = r_{sy}[l] = \sum_{i=-\infty}^{+\infty} h[i] r_s[l-i] \quad (6)$$

as the output of the modeling module 120 used to approximate h[l]. Preferred aspects of the present invention can be used to provide a best constrained estimate of h[l] given g[l], regardless of how $r_s[d]$ differs from a Dirac delta function.

Equation (4) illustrates an approach to identify the unknown system's 110 impulse response. Under most practical circumstances, the auto-correlation $r_s[d]$ does not have the ideal Dirac delta function property of being one at a delay of zero and zero otherwise. In fact, the auto-correlation may be unknown a priori or the auto correlation may change with time. As a result, the determined cross-correlation g[l] is not the unknown system's impulse response, but instead g[l] is distorted by the non-ideal auto-correlation $r_s[d]$ from the input signal as it is convolved with the system's impulse response.

The accuracy demanded in the unknown system's impulse response estimation is a function of the process that follows to alter the signal y 112. The process may be as simple as a filter f[k]. Although the filter f[k] can take on many forms, depending on the application, in communication systems the filter f[k] is used to "clean up" the communication channel output y[n] 112 to obtain a "best" estimate of the channel input s[n] 101. An example of a preferred implementation environment, which is useful for illustrating aspects of the present invention, is determining the equalizers f[k] for an OFDM communication system. Modern communication systems employing OFDM to achieve high bit rates estimate the channel for each OFDM symbol interval. The channel estimate should be robust and sufficiently accurate, but also should be sufficiently computationally simple to allow the channel to be estimated in a small interval of time.

Preferred embodiments of the present invention can be used to provide time-domain channel estimation through sub-space computations of the transmit signal's 101 statistics. A particularly advantageous strategy for time-domain channel estimation is identified here as least squares channel estimation (LS-CE).

LS-CE can provide an impulse response estimate g[l] 122 that minimizes the error in h[l] 110 due to $r_{sy}[d]$ (in equation (4)) in the least squares sense, by removing at least some of the undesired imperfections in $r_s[d]$ due to its deviation from the Dirac delta function. Generally speaking, this LS-CE approximation of the impulse response estimates a correction to be applied to $r_{ys}[d]$, $$g[l] = r_{ys}[l] - G(l, \hat{r}_{sy}[l], \hat{r}_s[l]) \quad (7)$$

for l=0, 1, 2 . . . , L−1. That is, a linear function G(·) of the cross-correlation and auto-correlation estimates is used to subtract the imperfections introduced by $r_s[d]$. This approach is stable and of greatly reduced complexity as compared to a de-convolution of $r_{ys}[k]$. Statistics related to the unknown system are not required. Further features of the formulation in equation (4) include the limited "support" needed for the values of l in the time span of interest.

Determining the linear function G(·) uses a formulation, in linear algebra terms, that generates a subspace basis from a vector consisting of the values in $r_{ys}[l]$, followed by a decomposition of the auto-covariance matrix with entries from $\hat{r}_s[l]$. Therefore, for L significant coefficients in h[l], the estimate g[l] is $$g = r_{sy} - Gb \quad (8)$$

where {g, $r_{ys}$} are L-by-1 vectors and G is a L-by-D matrix of columns generated from the vector, but not including $r_{ys}$. The D-by-1 vector b is derived from the auto-covariance matrix Rss, whose entries are given by the transmit signal's auto-correlation function and G preferably is determined through a least-squares formulation. D is termed the approximation index, as is explained below.

Any practical OFDM communication system must be capable of operating in a mobile environment. As such, the equalization process of the received signal should be capable of removing time varying channel distortions and should provide a channel estimate for each received OFDM symbol. The wireless communication standards aid in this channel estimation. In this particular system identification application, the channel constitutes the unknown system 110, and corrections to the received signal must be effected by a filter applied to the unknown system output 112. Another common aspect of currently available mobile or fixed location OFDM modems is the number of antennas and transmission schemes used to exploit the number of antennas at the transmitter and receiver. The added antennas increase the system's sensitivity to channel estimation errors and increase the necessary estimation accuracy.

Figure 2:
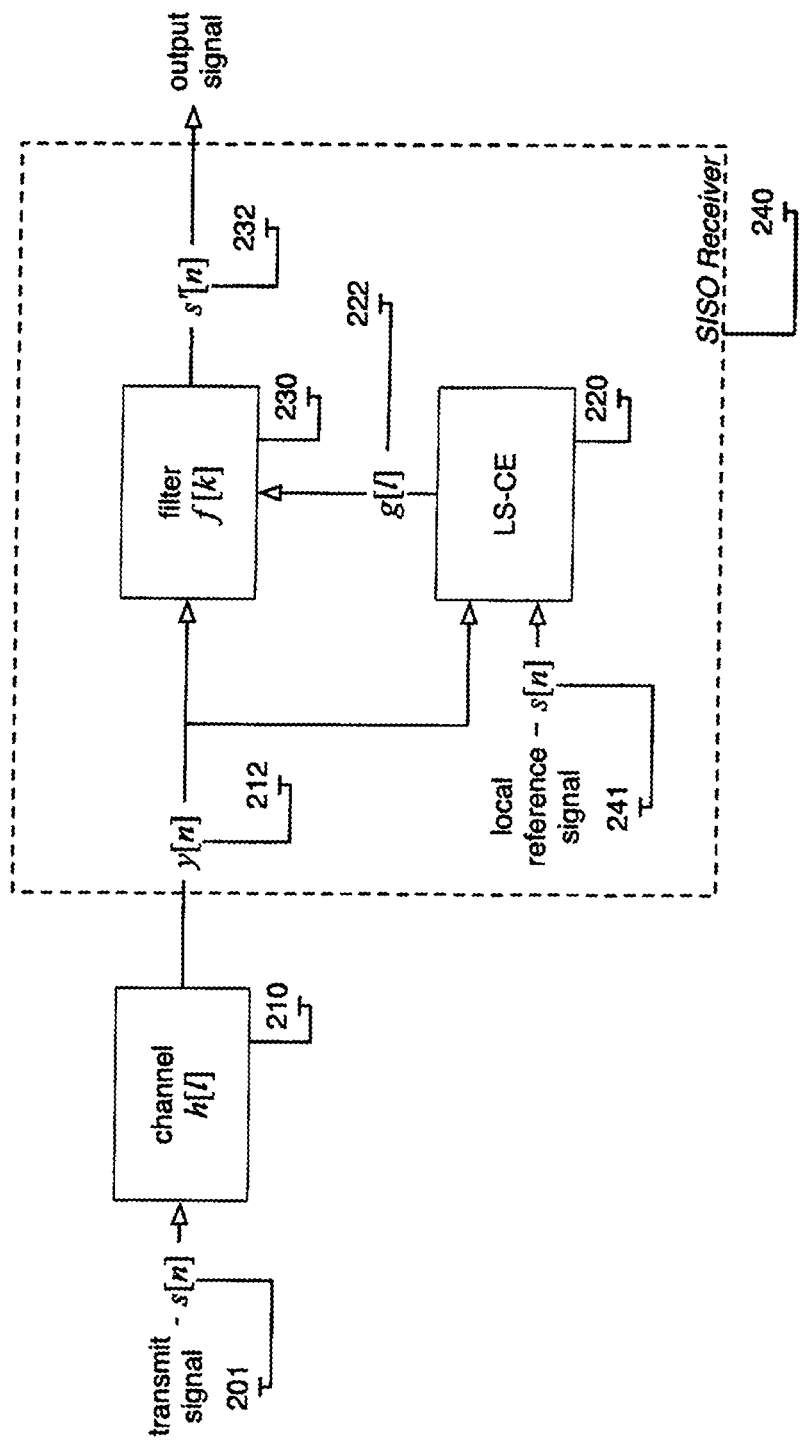
FIG. 2 schematically illustrates a SISO receiver according to a preferred embodiment of the present invention.

The simplest transmission scheme is one with a single transmit and receive antenna, as shown in FIG. 2. This configuration is termed single-input single-output (SISO) 240, which is the classic configuration for a communication system, whether wired or wireless, mobile or fixed. The salient feature for this configuration, as compared to other antenna schemes, is the single channel 210 that results in the simplest receiver. In this configuration, the receiver must identify the channel 210, using the least square channel-estimator 220, and then a filter 230 is calculated based on the channel estimate 222 to equalize the channel and replicate the transmitted signal 201 at the filter output 232. This operation is repeated for each symbol, whose samples are delineated in the input signal s[n] 201 with an additional time-synchronization circuit. This conditioning by the SISO receiver 240 is shown to operate on a time domain signal, which in OFDM corresponds to the application of a time equalizer (TEQ), and more generally can have other components including a frequency equalizer (FEQ).

The equalizer f[n] in an OFDM communication system is calculated for each symbol to establish a high-throughput link. The equalizer's ability to remove distortions depends on the channel estimation accuracy and the effective noise floor in the measurements. Obtaining an accurate estimate of the channel's reflective path delays and amplitude variations is important to achieving higher throughput rates. Higher throughput rates in OFDM are achieved in part by modulating the bits according to modulation schemes that are highly sensitive to channel distortions and noise. Such sensitive modulation schemes especially benefit from an equalizer that is more precise in its ability to remove channel distortions. From another perspective, use of a sensitive modulation scheme places a minimum requirement for accuracy in channel estimation.

Applying equation (6) to an OFDM system can be ineffective because of the auto-correlation properties of the transmitted symbol. The values of $r_s[d]$ in equation (5) for d≠0 are not sufficiently suppressed to allow sensitive modulation schemes, which could allow a higher throughput, to be implemented. In severe channels, it is possible that no successful link will be established between two terminals if the channel estimate is done with equation (6) without further corrections.

OFDM offers, under certain assumptions about channel characteristics, the ability to calculate and apply the filter in the frequency domain, which does not require the formulation in equation (4) to estimate the channel. This particular equalizer is termed the frequency equalizer (FEQ), and it is always required in an OFDM receiver, though its efficiency is compromised when the channel assumptions are violated.

Under practical conditions, OFDM systems may advantageously incorporate a time-domain channel estimate, even when the OFDM receiver incorporates only an FEQ. The number of parameters to estimate in the time domain channel estimation is smaller compared to the number of coefficients to determine for the FEQ. For example, in the WiMAX standard, the channel is assumed to not exceed 128 coefficients, but the OFDM symbol has 840 active carriers so that the number of parameters to estimate is reduced by a factor of seven in the time domain. Furthermore, estimation in the time domain is not affected by the loss of orthogonality that can occur through the fast Fourier transfer (FFT) transformation due to imperfections in the channels (e.g., carrier offset) that cause inter-carrier interference (ICI). Therefore, these properties of time-domain channel impulse response (CIR) estimation provide a robust basis for estimating the channel.

Figure 3:
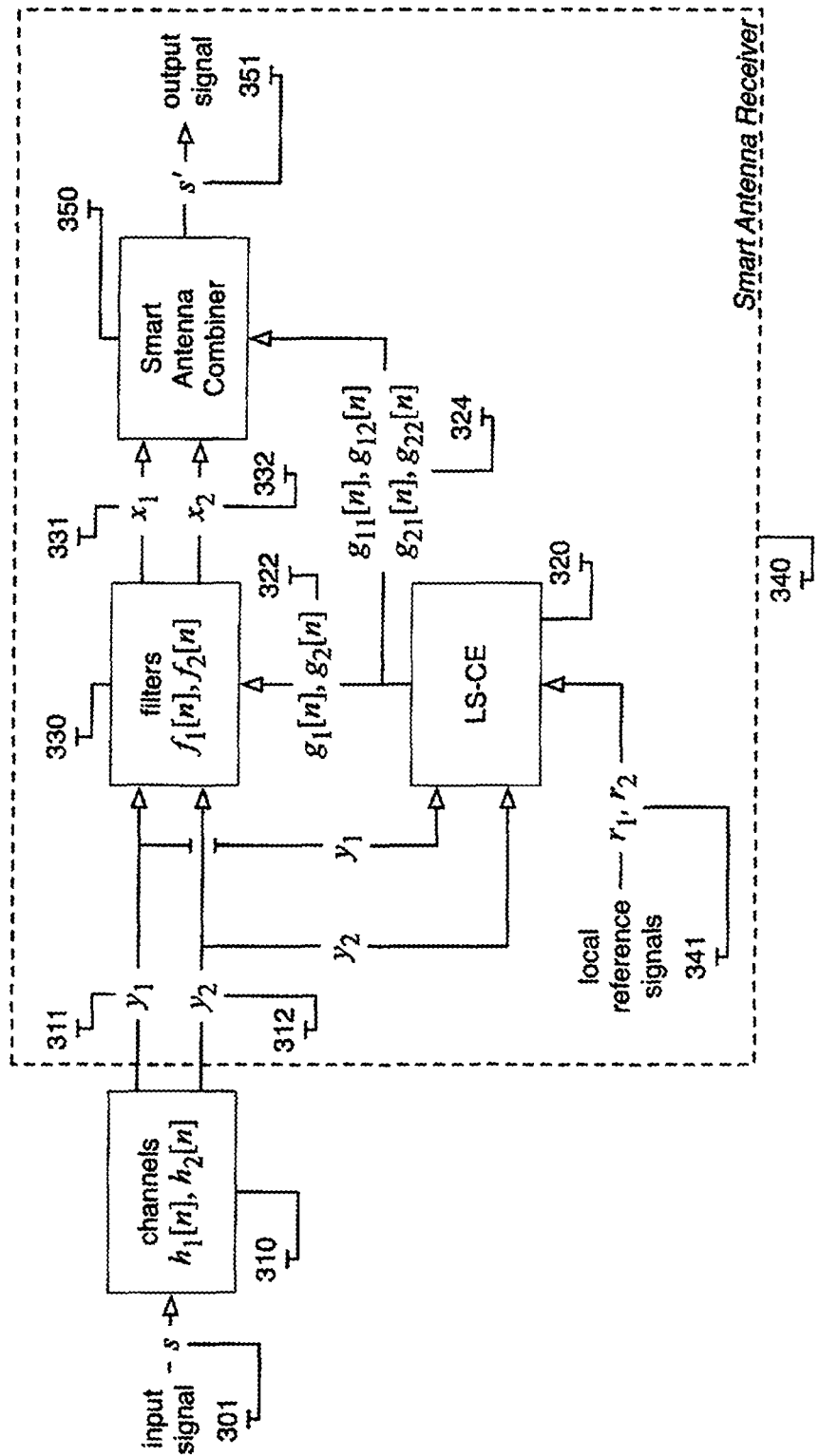
FIG. 3 schematically illustrates a MIMO receiver that implements smart antenna combining according to a preferred embodiment of the present invention.

FIG. 3 shows another configuration of interest, where there is a single transmission stream 301 received with two antennas. Consequently, there are two channels to equalize and to combine to obtain an improved estimate of the singly transmitted signal 301. In this configuration, it may be advantageous to utilize equalizers 330 for each received signal 311 and 312, and then apply smart antenna 350 type combining to desirably process the diversity received signal. See, for example, Godara, *Smart Antennas* (2004). At its best performance, smart antenna combining can offer a 3 dB power gain versus a single antenna configuration. In the case of OFDM, the time domain filters 330 may be optional. In an OFDM receiver the smart antenna 350 combining may be applied in the frequency domain, as those skilled in the art can determine the time versus frequency domain implementation.

The filter 330 and smart antenna 350 conditioning on the input signals achieve their best performance as a function of the channel estimation accuracy. The present invention offers high accuracy at low complexity by estimating the channel in the LS-CE module 320, which processes each input signal available (e.g., 311 and 312) to output channel estimates 322 for equalization, and additional cross terms 324 for improved smart antenna combining 350 and greater fidelity in the estimate 351 of the input signal 301. The reference signals 341 are devised in accordance with the LS-CE processing requirements, derived from existing reference signals embedded in OFDM symbols as specified in standards, for example.

Figure 4:
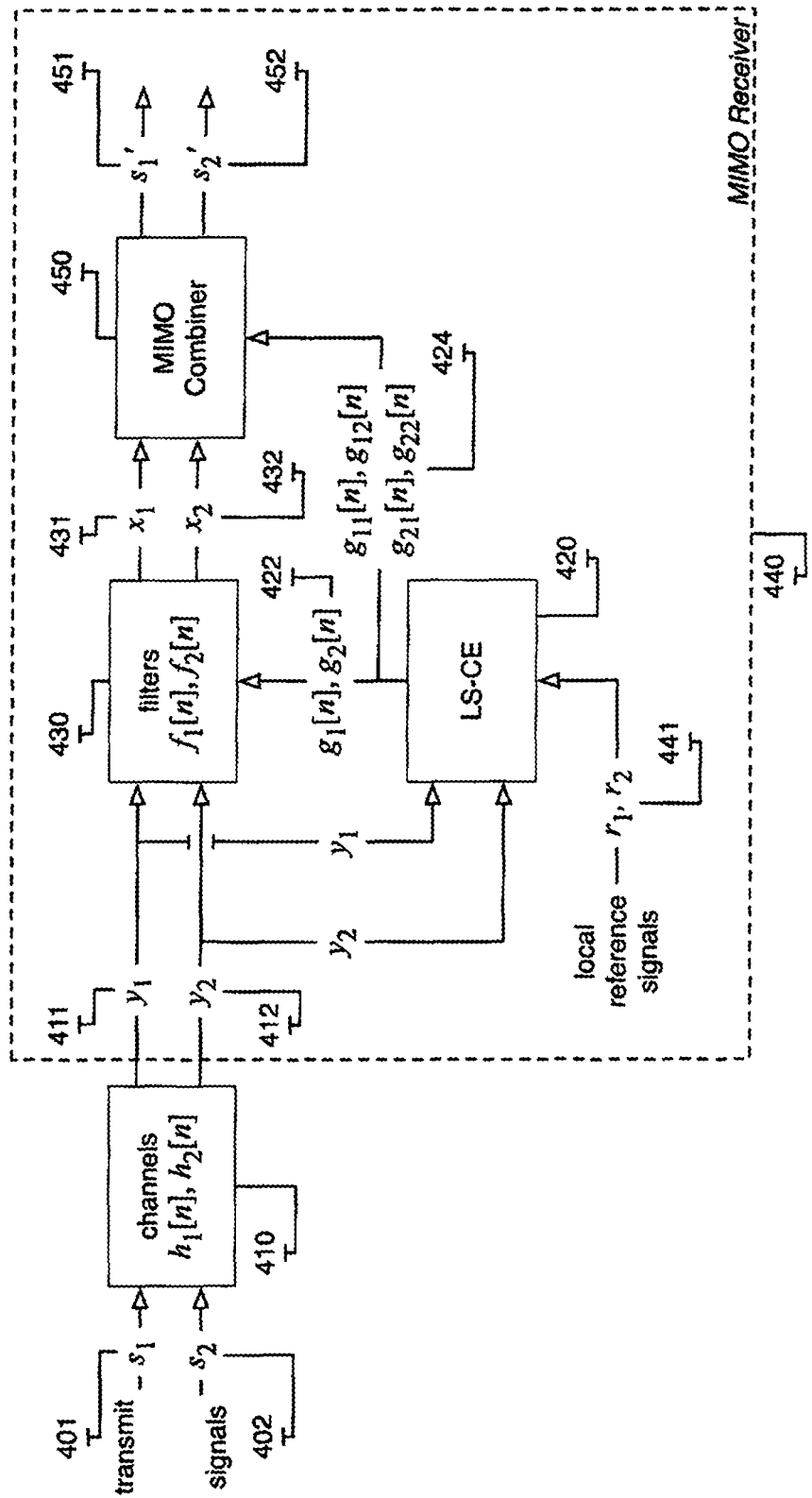
FIG. 4 schematically illustrates a MIMO receiver that implements MIMO combining according to a preferred embodiment of the present invention.

The other alternative multiple-antenna configuration possible in an OFDM receiver is the MIMO receiver 440 in FIG. 4. In this configuration, the transmitter simultaneously transmits a plurality of signals, with two shown in FIG. 4, each affected by different channels 410. Each signal (411 and 412) received from a respective one of a plurality of antennas at the receiver has a combination of each transmitted signal (401 and 402). As is the case for a smart antenna receiver 340, the MIMO receiver 440 may include a time-domain filter 430, and preferably processes the MIMO combining 450 and separating in the time domain. The filter and MIMO combining can also be performed in the frequency domain in the case of OFDM signals.

Unlike the condition in the smart antenna receiver 340, the MIMO combiner 450 extracts plural signals (451 and 452) sent simultaneously by the transmitter. This is the principal appeal of a MIMO system, which increases the throughput as compared to the same link coupled to a SISO receiver 240.

The performance of filter 430 and MIMO 450 conditioning on the input signals is a function of the channel estimation accuracy. Receivers according to some aspects of the invention can be implemented so as to offer such high accuracy at low complexity by estimating the channel in the LS-CE module 420. Preferred implementations of the LS-CE module 420 process each available input signal (e.g., 411 and 412) to output channel estimates 322 for equalization and additional cross terms 424 for improved MIMO combining 450 and greater fidelity in the estimate 451 of the input signals 401 and 402. The reference signals 441 preferably are devised in accordance with the LS-CE processing requirements for MIMO receivers, derived from existing reference signals embedded in OFDM symbols as specified in standards, for example.

To use an LS-CE to estimate the unknown channel(s), two input signals are required, including a reference signal. In the case of OFDM signals, and in particular drawing from the WiMAX (IEEE 802.16) standard, the reference signal is derived from training signals embedded in the transmitted symbols.

An OFDM symbol includes a number of samples related to the size of the fast Fourier transform (FFT) the OFDM modulator uses to generate the time-waveform. The OFDM symbol also includes a pre-determined number of samples from the beginning of the symbol that are copied and appended to the end of the symbol. These copied samples are termed the cycle prefix. The symbol rate is the inverse of the duration of the totality of the OFDM symbol and the cycle prefix samples. In the WiMAX system, symbols are grouped in time to form a frame. This is demonstrated in FIG. 5.

Each OFDM symbol transmitted within a frame has a function and a structure according to the information it carries. The first symbol contains no user information or data. The entire first symbol consists of a predetermined number of carriers, each modulated with an a priori known value. This kind of symbol is often referred to as a pilot symbol 510, because the symbol can be replicated perfectly at the receiver for comparison. Additional symbols are then transmitted that contain information for configuration of the network for all users in the network. These symbols are often termed control symbols 540. The remaining symbols are configured to simultaneously include the information or data (data modulated subchannels 520) transmitted to each user and the additional pilot subchannels 530.

An OFDM symbol's time domain samples derive from a plurality of modulated carrier signals in the frequency domain, which are then grouped together into a singular time domain waveform through addition. This addition is effectively computed with an inverse fast Fourier transform (FFT). Then, the standard provides a systematic assignment of a subset of the active carriers, each carrier also termed a subchannel, to be modulated with a known set of carrier amplitude and phase rotations. These are the pilot subchannels. The standard may dictate that these subchannels need not be contiguous. The information bits to be transmitted to a user are likewise mapped into amplitude and phase rotations according to the specifications in the standard.

The user symbols containing the information bits can be sent simultaneously with the training pilot subchannels (known a priori at the receiver). If the channel conditions do not cause a loss of assumed properties about the OFDM symbol, the received symbol will have no significant interference between the pilot and data subchannels. Therefore, the receiver can systematically extract the pilot subchannels and compare the pilot symbols to their ideal state and use the observed errors to devise a frequency domain channel estimate.

Figure 5:
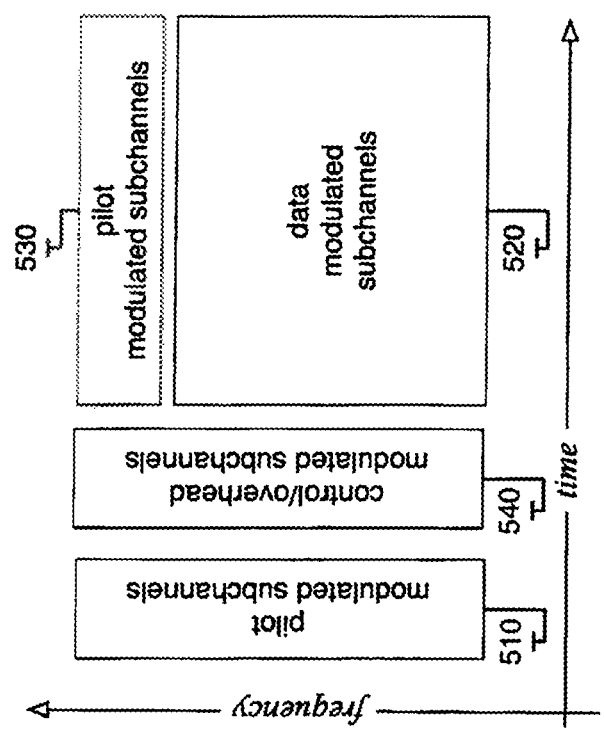
FIG. 5 schematically illustrates the structure of a conventional WiMAX frame.

Preferred embodiments of the present invention use the pilot subchannels differently, in that the channel estimation preferably is accomplished in the time domain. In the time domain, the OFDM symbol has a plurality of data and pilot subchannels added together into a short-duration waveform, and thus, the receiver does not have an a priori waveform that can be generated at the receiver for a local reference (e.g., 241, 341 and 441). The separation of these data and pilot subchannels is readily accomplished in the frequency domain as is illustrated in FIG. 5. The time domain representation of the pilot symbol subchannels 510 can be replicated ideally at the receiver since there are no data subchannels transmitted for that symbol.

Figure 6:
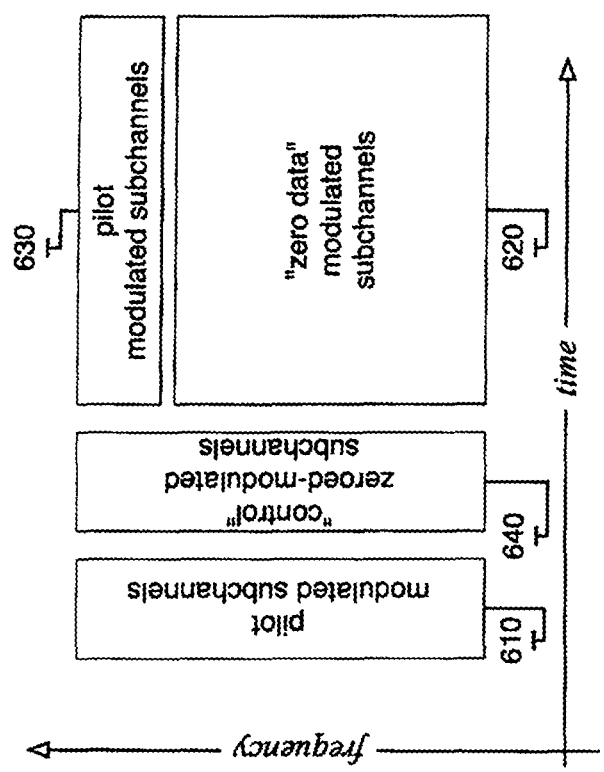
FIG. 6 schematically illustrates the structure of one example of a reference signal frame that is locally generated based on received information and specifically a frame structure that can be used for receiving a WiMAX communication.

Aspects of the present invention preferably locally generate and use a reference waveform generated to have the symbol structure of a desired signal. For example, the reference waveform may be generated to have the form of an OFDM frame, as shown in FIG. 6. For the embodiments described here it is particularly advantageous to provide a reference waveform in the time domain. The time domain OFDM reference waveform incorporates the pilot symbol 610 (FIG. 6) which is a duplicate of the pilot symbol 510 as shown in FIG. 5. The duration for the control symbols 540 may be ignored by the LS-CE implementations in the case of WiMAX by generating zeroed symbols 640 as shown in FIG. 6. The system preferably generates a reference signal corresponding to the pilot and data symbols 530 and 520 that are transmitted over the rest of the frame by replicating the pilot subchannels 530 in locally generated reference frame 630, while "zeroing" the data subchannels 620. That is, the system generates the data subchannel 620 to correspond to modulated data with all of the data values set to zero.

The minimum mean square error (MMSE) formulation for the time-domain channel estimation (TDCE) in WiMAX uses a linear channel model, such that, $$y = Hx + n \qquad (9),$$

where x is the transmitted signal, n is the noise vector and y is the received signal vector. The matrix H is the channel convolution matrix. The MMSE estimation for the transmit signal x is given by, $$\hat{x} = R_{yx} R_{yy}^{-1} y \quad (10),$$

where $R_{xy}$ is the cross-correlation between input and output variables x and y. Note that the specific node at which the received signal y is identified with respect to the receiver circuitry is somewhat arbitrary and can be selected so that it does not impact on the analysis discussed here. Even when applied in the frequency domain, the formulation is rather complex:

$$\hat{H}_{MMSE} = R_{HH_p}(R_{HH_p} + \sigma_n^2(XX^H)^{-1})^{-1}\hat{H}_{LS} \quad (11),$$

where X is a diagonal matrix with the transmit signal's spectrum (FFT(x)), $$\hat{H}_{LS} = X^{-1}Y \quad (12),$$

and Y is a diagonal matrix with the spectrum for the received signal obtained, for example, from a fast Fourier transform (FFT) of the received signal. $H_p$ is the channel frequency response (CFR) for the pilot subcarriers. Use of singular value decomposition can reduce the complexity of this operation.

A simple method to estimate channels is via the cross-correlation of a locally generated and conjugated reference signal with the signal received at the input of the receiver. This cross-correlation will find the "copies" of the reference signal in the received signal at the delays of the channel. On the other hand, the underlying condition for this cross-correlation to work is that the auto-correlation property of the sequence is (practically) a single spike when aligned, and nearly zero elsewhere. This is the case for most pseudonoise (PN) sequences used in spread spectrum communications and generally sufficiently true for CDMA cellular systems. In contrast, OFDM does not have such a property.

A particularly preferred approach for an OFDM system is to cross-correlate a conjugated locally-generated reference signal with the signal received from the channel (which can be designated the input to the receiver) and to use that cross-correlation result as an initial estimate of the channel. This approach then revises the channel estimate from this initial channel estimate over D steps. Starting with a noiseless case, the linear model from equation (12) states the relationship of the transmitted symbol and the channel and can be equivalently stated as, $$y = Hx = Sh \quad (13)$$

where S is the matrix with the values of x as a convolution matrix. The vector y is the received OFDM symbol.

A fundamental assumption for the least squares (LS) channel estimation strategy is that starting with an initial estimate, such as $h_1$, the receiver can make an estimate that converges toward the ideal channel h. The second assumption is that a step from D to D+1≤$D_{stop}$ does not increase the MMSE on the estimation error to the true channel, for some $D_{stop}$≤L, where L denotes the channel length. This assumption informs the idea of repeated revisions on the original estimate and subsequent modifications.

Based on these assumptions, $$y = Sh \approx S(h_1 + G_D b) \quad (14)$$

where $G_D$ is termed the D-step revision matrix, or the revision matrix at approximation index D. The initial guess (initial channel estimate) $h_1$ is preferably determined to minimize complexity. The revision matrix is of dimension L×D, and the coordinate vector b is D×1. Then, the following equivalences to equation (14) are apparent, $$S^H \hat{y} = S^H S(h_1 + G_D b) = \hat{R}_{SS}(h_1 + G_D b) \quad (15)$$

$$G_D^H S^H \hat{y} = G_D^H \hat{R}_{SS} h_1 + G_D^H \hat{R}_{SS} G_D b \quad (16)$$

and noting that $y - \hat{y} = e_D$ is the error on the revision matrix $G_D$, then $$G_D^H S^H y + G_D^H S^H e_D = G_D^H \hat{R}_{SS} h_1 + G_D^H \hat{R}_{SS} G_D b \quad (17).$$

Choosing D for $G_D^H S^H e_D$ to be sufficiently small gives $$G_D^H S^H y = G_D^H \hat{R}_{SS} h_1 + G_D^H \hat{R}_{SS} G_D b \quad (18)$$

where $S^H y$ is a cross-correlation of the received signal with the conjugate of the reference signal. As discussed in greater detail below, the computational complexity can be further reduced by defining $h_1$ (the initial guess) to be this cross-correlation.

Equation (15) has two unknown variables: the revision matrix $G_D$ and the coordinates for the revision matrix. A suitable approach to generate the revision matrix $G_D$ is to use an initial guess vector $h_1$ and the Lanczos strategy, or the Arnoldi strategy if $\hat{R}_{SS}$ is not Hermitian. Either strategy computes $G_D$ given a seed vector $h_1$ so that, $$G_D^H h_1 = 0 \quad (19).$$

That is, $G_D$ is determined to be orthogonal to the initial guess vector $h_1$ and preferably provides a basis that spans the space to project the initial guess vector to the desired correction vector. Preferred implementations then continue to solve for the coordinates that provide the improved channel estimate $h_D$ with $h_1 = S^H y$ as an initial condition seed vector:

$$-G_D^H \hat{R}_{SS} h_1 = G_D^H \hat{R}_{SS} G_D b \quad (20)$$

$$b = -(G_D^H \hat{R}_{SS} G_D)^{-1} G_D^H \hat{R}_{SS} h_1 = -T_D^{-1} G_D^H \hat{R}_{SS} h_1 \quad (21)$$

and then, $$h_D = h_1 + G_D b \quad (22)$$

is the channel estimate.

The Lanczos strategy, which is presently a particularly preferred strategy to obtain $G_D$, has a "self-stop" feature, in that it ceases to generate orthogonal basis vectors (the columns of $G_D$) once an eigenvector is found. This is the designed or intended outcome for the Lanczos and Arnoldi strategies.

If $\hat{R}_{SS}$ is a diagonal matrix, then the strategies stop with the cross-correlation estimate $h_1$. This is because any vector is an eigenvector to an identity matrix. However, this is why $h_1$ preferably is defined to be the cross-correlation vector $h_1 \equiv S^H y$, which is the perfect channel estimate for an uncorrelated signal x (e.g., x is white Gaussian noise). Therefore, the only condition under which $\hat{R}_{SS}$ is a scaled identity matrix is when the signal x is white Gaussian noise or a pseudonoise sequence with zero-valued auto-correlation outside the zero-delay lag.

When $\hat{R}_{SS}$ is an identity matrix, it commutes with any matrix and the following conditions hold:

$$b = -T_D^{-1} G_D^H \hat{R}_{SS} h_1 = -T_D^{-1} \hat{R}_{SS} G_D^H h_1 = -T_D^{-1} \hat{R}_{SS} 0 = 0 \quad (23).$$

hence $$h_D = h_1 + G_D b = h_1 \quad (24).$$

Another observation relates to the "richness" of $\hat{R}_{SS}$. If the transmitted signal has poor auto-correlation properties, then the value of D that results in a target estimation error power $\xi = e_D^H e_D$, will be lower than one with good auto-correlation properties.

Preferred implementations of the present invention preferably implement an LS-CE in one of two ways, depending on the statistical properties of the OFDM signal characteristics for a given standard. One preferable implementation is termed the "deterministic LS-CE" to denote that the locally generated reference signal (e.g., 241, 341 or 441) is a locally generated signal with the construction illustrated in FIG. 6, in the case of WiMAX. If the second-order statistics for the transmit signal are stable for the channel under consideration, then a "stochastic LS-CE" implementation like that illustrated in FIG. 8 may be preferred.

Figure 7:
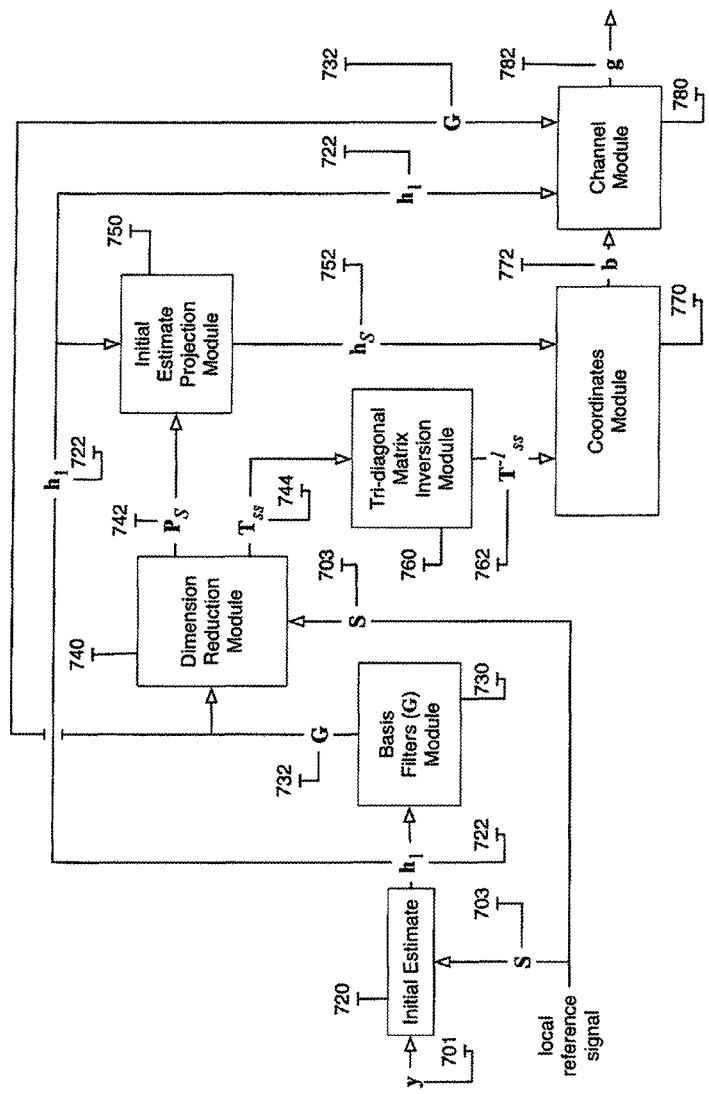
FIG. 7 schematically illustrates aspects of a deterministic least square channel estimation circuit according to preferred aspects of the present invention.

FIG. 7 shows a deterministic LS-CE of a type that can advantageously be implemented in an OFDM receiver (e.g., 220, 320 or 420). The signals in FIG. 7 are noted as linear algebra constructions to provide a parallel to the equations that describe the LS-CE. Furthermore, the illustrated circuits are made up of simple multiply-and-accumulate (MAC) hardware elements that are readily adapted to linear algebra operations such as matrix-vector or vector-vector multiplications. Those skilled in the art will readily design appropriate hardware with low complexity for any specified operation shown in FIG. 7. Alternately, the FIG. 7 or other circuitry in this description could be implemented within a digital signal processor or in a general purpose processor.

The locally generated reference signal from FIG. 6, constructed from one symbol by the convolution matrix S 703, is multiplied by the received signal vector y 701 (input to the receiver) to produce the initial channel estimate $h_1$ 722. The initial channel estimate is simply the convolution of the two signals represented in equations (1) and (2). Preferably these signals are constructed so that the receiver timing is established to align a symbol in the vector y 701 with the reference symbol in S 703 so that the initial estimate vector $h_1$ 722 captures all the replicas of the symbol in the channel significant to the receiver implementation. The length L for the channel estimate, and consequently the dimension of $h_1$ 722 as an L×1 vector, preferably is determined by simulation and expected conditions in the implementation environment.

The basis filter module 730 determines D basis filters, where D is a fixed parameter determined based on performance goals and simulation verifications, preferably using the Lanczos method. Under most known circumstances, the value of D will be somewhere between three and five. Preferably, the matrix G 732 then consists of D columns corresponding to basis filters determined through the Lanczos method.

The gain in the LS-CE is used to reduce the dimension of the received signal's auto-covariance matrix. This reduction in dimension is achieved with the matrix G 732. The dimension reduction module 740 performs this dimensionality reduction by taking the correlation matrix with the reference signal S 703, which is N×L, and produces two matrix outputs: $P_S$, a D×L matrix, and $T_{SS}$, a D×D matrix. The hardware generates these outputs through the following definitions:

$$P_S = G^H S^H S \quad (25)$$

and $$T_{ss} = P_S G \quad (26).$$

Preferably the order of multiplication in equation (25) is selected to minimize the number of MACs required. As discussed above, N is the length of the vector y 701, which is determined by the length of the OFDM symbol, which the WiMAX standard 802.16e specifies as N=1024. Thus, typically, D<<L<<N.

Determining the coordinates b in equation (21) uses two parallel operations. The first operation inverts $T_{SS}$, which is simpler to perform than the N×N matrix inversions in equations (10) and (11). The second operation projects the initial channel estimate $h_1$ 722 to a lower dimension space, using an operation defined as, $$h_S = P_S h_1 \quad (27)$$

which is a D×1 vector. The operation of equation (27) is performed in the initial estimate projection module 750, which generates output $h_S$ 752. The coordinates b are determined by $$b = -T_{SS}^{-1} h_S \quad (28)$$

in the coordinates calculation module 770, from the inputs $T_{SS}^{-1}$ 762 and $h_S$ 752.

The final operation is performed by the channel calculation module 780, which corrects the imperfections in the computation of $h_1$ to provide the improved channel estimate g 782. This operation is simply, $$g = h_1 + Gb \quad (29).$$

Preferably, the hardware is selected through the arrangement and the use of MACs and signal paths so that the estimate g 782 is determined within an OFDM symbol duration, that is, over N sample clock cycles.

Figure 8:
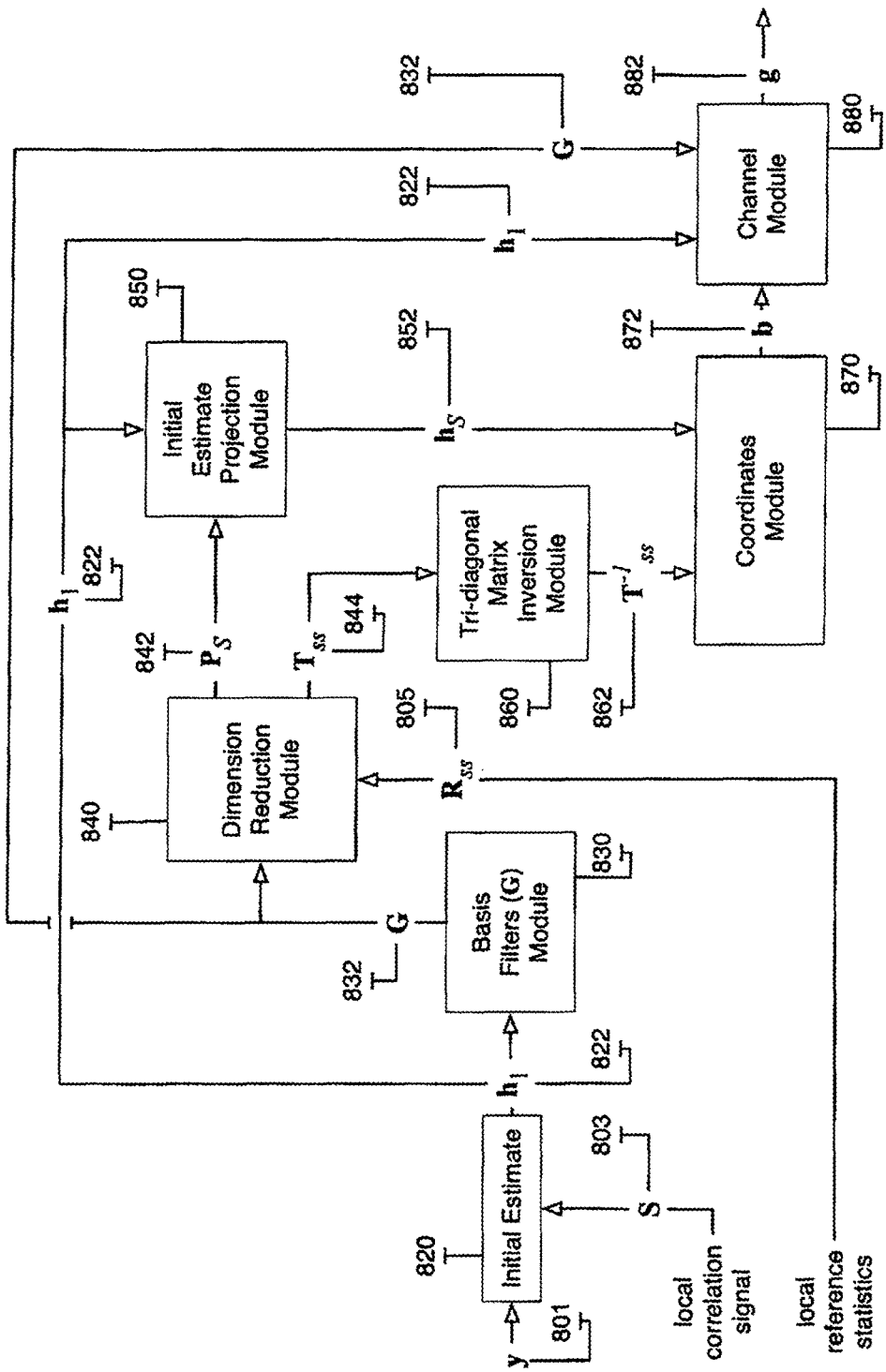
FIG. 8 schematically illustrates aspects of a stochastic least square channel estimation circuit according to preferred aspects of the present invention.

FIG. 8 shows the operations for the stochastic LS-CE that preferably may be used in an OFDM receiver (e.g., 220, 320 or 420) for appropriate environments such as when the second order statistics of the transmit signal in the channel of interest are stable. The modifications relative to the hardware in FIG. 7 are minimal, but can offer simplification and implementation savings. The principal differences include that the dimension reduction module 840 accepts an L×L matrix $R_{SS}$ 805 instead of the convolutional matrix S 703 in FIG. 7.

As the inputs to the dimension reduction module 840 are different than in its counterpart 740 in FIG. 7, the operations of module 840 preferably are reconfigured. Specifically, equation (29) preferably is re-defined as $$P_S = G^H R_{SS} \quad (30)$$

and equation (30) remains as $$T_{ss} = P_S G \quad (31)$$

and these equations are implemented in the circuitry of dimension reduction module 840. The simplification savings stem from assuming that $R_{SS}$ 805 is a constant matrix for all OFDM symbols input over time.

This assumption about the auto-covariance matrix $R_{SS}$ is based on the following observation. Depending on how the LS-CE is implemented for a particular OFDM system, the design of the reference signal S (803 or 703) may produce the condition that, $$\hat{R}_{SS} = S^H S \approx R_{SS} \quad (32).$$

The implication here is that the instantaneous auto-covariance matrix $\hat{R}_{SS}$, which can be calculated at every symbol, may not vary much from the long-term average. That is, $R_{SS}$ is the average of $\hat{R}_{SS}$ over all time. Thus, for certain types of OFDM symbols, regardless of the data present in the modulated carriers, the value of $\hat{R}_{SS}$ does not vary significantly from $R_{SS}$.

The simplification achieved by implementing equation (30) rather than equation (25) allows a hardware or software engineer to implement a simpler design according to aspects of the present invention. The LS-CE in FIG. 8 preferably also may be implemented as a lower-power version of what is shown in FIG. 7.

Figure 9:
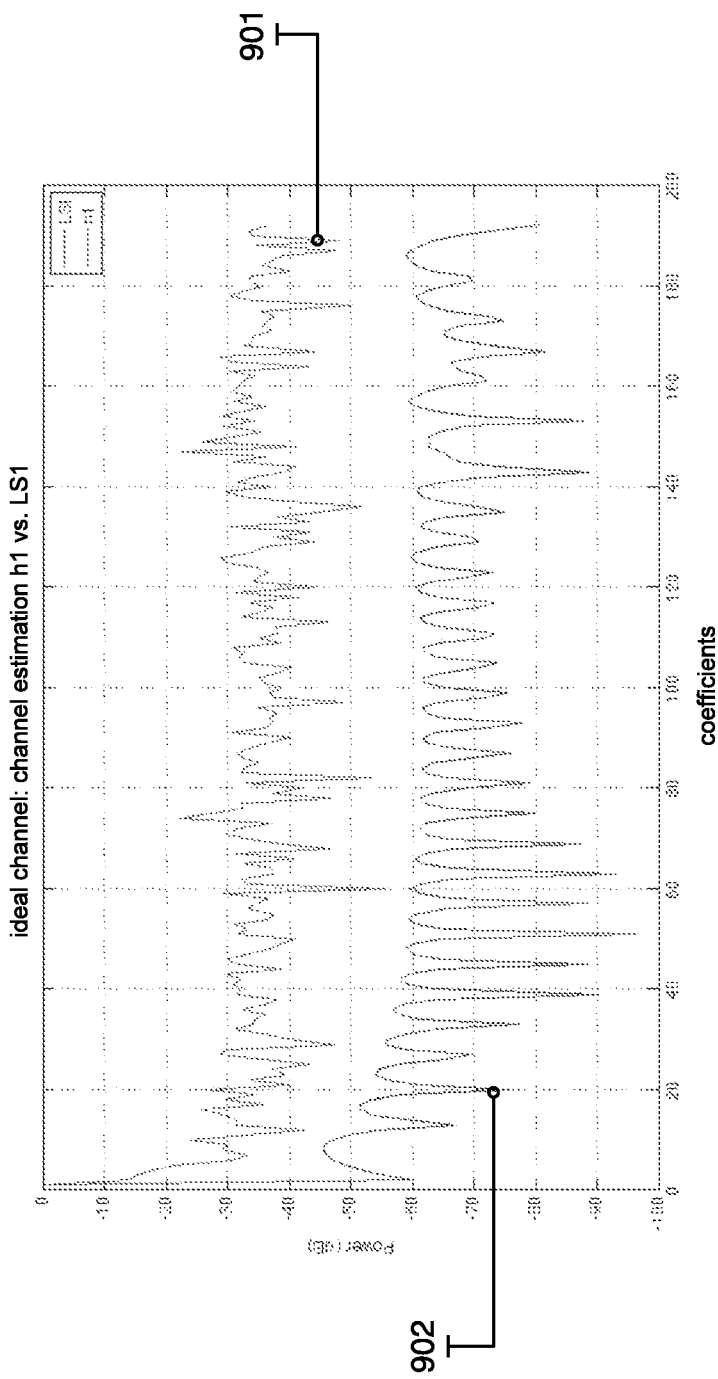
FIG. 9 graphically presents signal reception using a base line cross-correlation channel estimate as compared with a channel estimation performed according to the circuitry illustrated in either FIG. 7 or FIG. 8.

The plot in FIG. 9 shows the improvement achieved by the LS-CE operation to improve the channel estimate from a simple cross-correlation computation as the initial estimate $h_1$ (722 or 822). In this example, the cycle prefix in the OFDM symbol is 128 samples, while the estimation exceeds that length. The length of 192 samples for estimation can lead to ill-conditioned $R_{SS}$ matrices, as verified in simulations, resulting in an inability to directly perform the operation represented by equation (11). The estimate based on a simple cross-correlation between the local reference signal 803 and the input signal 801 is shown as $h_1$ 901. The application of the determined additive inverse, $G_Db$ in equation (22), results in the much improved channel estimate 902, as in equation (22).

Figure 10:
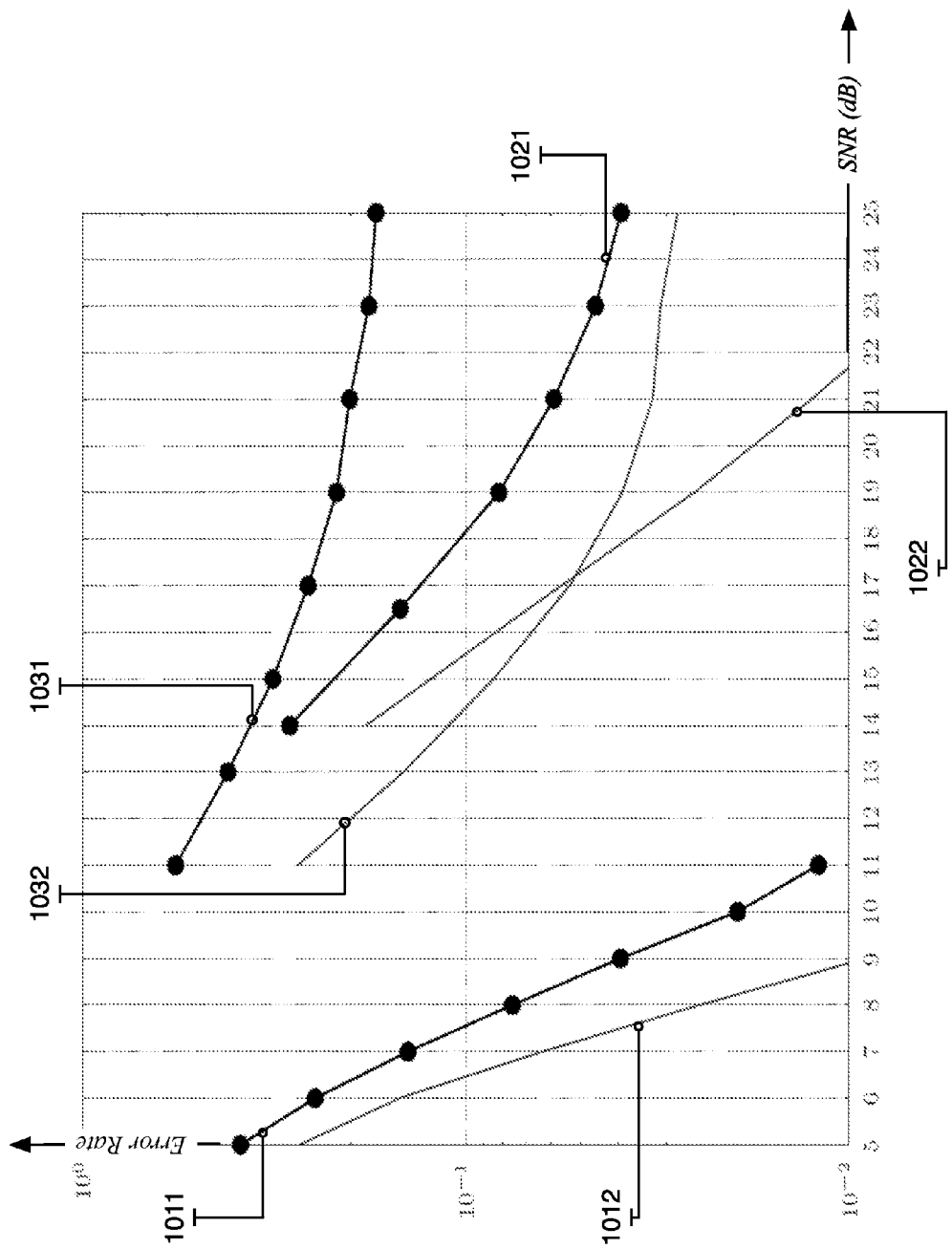
FIG. 10 graphically presents the packet error rates achieved using a base line cross-correlation channel estimation strategy as compared with a channel estimation performed according to the circuitry illustrated in either FIG. 7 or FIG. 8.

The inclusion of the LS-CE into a WiMAX simulator further demonstrated the performance gains that can be obtained through implementation of the LS-CE. The WiMAX simulator used, Agilent Advanced Design System (ADS), performs better than implementable systems because the ADS knows some key parameters to compute the system's frequency equalizer (FEQ) for each received symbol. FIG. 10 shows the performance differences between the ADS implementation and the modified receiver that computes the FEQ coefficients in the time domain with the LS-CE.

WiMAX allows for six different data rates to be transmitted on the downlink, and FIG. 10 shows the performance for three of those data rates. At a $10^{-1}$ link performance target, the LS-CE enabled receiver 1012 offers about a 1 dB improvement over the ADS implementation 1011, when QPSK modulation is used on the data carriers. When the data rate is further increased by using 16 quadrature amplitude modulation (QAM), the gain is about 3.5 dB between the LS-CE enabled receiver 1022 and ADS 1021. When switching to the most sensitive and highest throughput link, which uses 64 QAM, the LS-CE 1032 can establish a link to the user, while the ADS fails 1031.

Communication between a tower and a user may not achieve the best possible bit rate due to interference from adjacent towers and other sources. Therefore, interference cancellation, or at least some form of mitigation, preferably is added to the receiver, since the simplest OFDM receiver does not provide inherent interference mitigation, let alone cancellation, capabilities.

Figure 11:
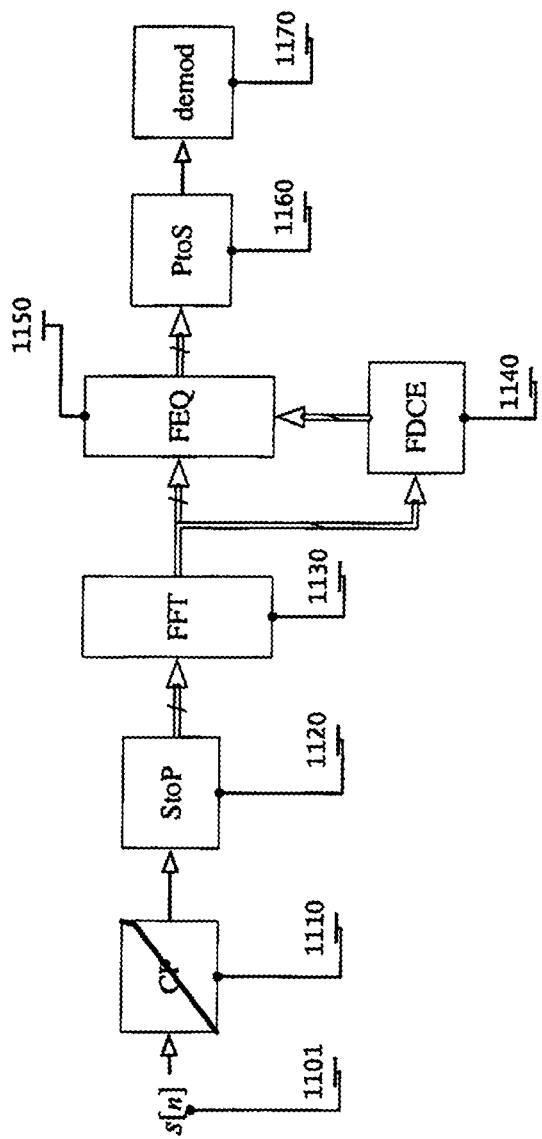
FIG. 11 schematically illustrates a conventional orthogonal frequency domain multiplexing (OFDM) receiver configuration.

FIG. 11 shows the most basic OFDM receiver, which can also implement an adequate WiMAX receiver. The processing steps are conventional and include the OFDM receiver removing the cycle prefix (CP) 1110 from the received signal. Given the N pre-determined, and thus known to the receiver, samples in an OFDM symbol, a single (serial) stream of samples is reorganized into N parallel samples to feed fast Fourier transform (FFT) processor 1130. The next step is to obtain a frequency domain channel estimate 1140 to properly equalize the signal to account for the multipath distortion in the channel. The coefficients, one per active carrier in the OFDM symbol, are implemented with a frequency equalizer (FEQ) 1150. Subsequent to this equalization, the parallel stream of samples from the active data carriers is reconfigured as a serial stream 1160 of samples for the demodulation processing 1170 which outputs the transmitted bits.

The simple OFDM receiver in FIG. 11 can be designed to be cost effective and to achieve adequate receiver performance provided that the channel distortions are confined to a restrictive set of conditions. If these conditions are not met, such as if the channel coefficients exceed the cycle prefix (CP) length or excessive interference is present, then the frequency domain channel estimator FDCE 1140 may lose accuracy as a function of the severity of these distortions. This accuracy loss post-FFT processing is then manifested as an increase in bit error rate at the demodulator output 1170. Although equalizers are known to correct for channel distortions, the OFDM receiver in FIG. 11 performs channel estimation after FFT processing and, consequently, the increased cross-talk between carriers causes further signal degradation before the channel is estimated.

Figure 12:
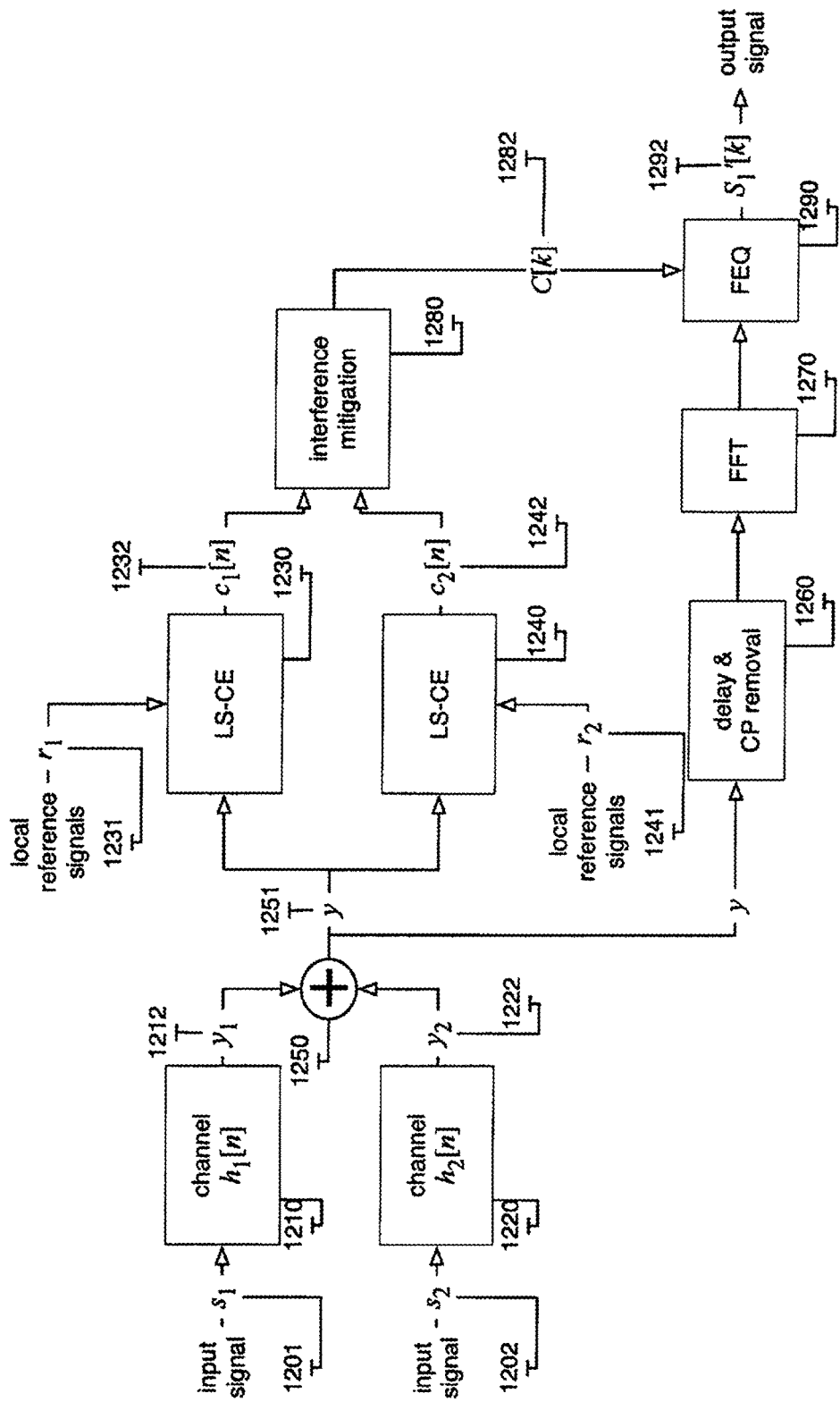
FIG. 12 schematically illustrates an OFDM receiver in accordance with aspects of the invention that provides interference mitigation in an illustrative two base station environment.

Several aspects of the present invention are implemented in a preferred OFDM receiver, illustrated schematically in FIG. 12, which has a number of advantages over the conventional FIG. 11 receiver. In the example illustrated in FIG. 12, channel estimation preferably is performed in the time domain, thus offering a channel estimate that reduces the effects of interference when compared to an equivalent estimation in the frequency domain (1140 in FIG. 11). Most preferably, the FIG. 12 receiver incorporates channel estimations as illustrated in either FIG. 7 or FIG. 8 and described above, using a reference signal as illustrated in FIG. 6 and described above. FIG. 12 illustrates aspects of processing in a single antenna (SISO-type) OFDM receiver and more generally shows two or more channels corresponding to a multiple base station or transmitter OFDM system where the illustrated receiver detects signals output by multiple transmitter antennas. Of course the receivers illustrated in the drawings are more generally parts of transceivers or more complicated communications systems.

In any cell network deployment, signals from a plurality of base stations may reach a user with significant power. Preferred implementations of the present invention readily provide for interference mitigation, or cancellation, in OFDM systems by avoiding the use of channel estimation in the frequency domain. The level of interference suppression for an OFDM communication system and hence, the scale of the complexity added to the generic receiver, is preferably selected to achieve the target receiver operating characteristics in the presence of expected multipath and interference. FIG. 12 illustrates the simultaneous reception of signals from two base stations (1201 and 1202) but there may be signals received from a larger number of base stations in practice. Typical cell-network design assigns different channels for each corresponding station so that the signal from base station one 1201 has a corresponding channel 1210. Likewise, the signal from base station two 1202 has a corresponding channel 1220. A single antenna receiver receives a sum 1250 of both channel outputs (1212 and 1222). In the case of multiple antennas, there are a plurality of such additions and preferably the multiple antenna receiver adopts appropriate channel estimation (e.g., estimation as shown in FIGS. 6-8 and discussed above and additions as shown in FIGS. 3-4 and discussed above) to correspond with the underlying processes shown in FIG. 12.

To mitigate interference, preferred embodiments of the present invention preferably estimate each channel for each interferer. For the example shown in FIG. 12, one LC-CE unit 1230 determines the channel estimate for one base station signal 1201 using an appropriate reference signal 1231. Preferably, another LC-CE unit 1240 simultaneously determines the channel estimate for the other base station signal 1202, also using the appropriate reference signal 1241. The estimation accuracy depends on the orthogonality property between the two reference signals. Typically, as in WiMAX, the reference signals are designed to be orthogonal so that the correlation between the two reference signals is zero.

An interference mitigation module 1280 performs operations to mitigate a single channel. Module 1280 offers the target suppression level for the base station causing the interference, while maximizing the desired base station's power. A plurality of approaches to such computations with varying degrees of performance is known in the art. A preferred embodiment of the interference mitigation module 1280 performs a simple transformation on the desired base station 1201 channel estimate 1232 to include a component of the interfering base station 1202 channel estimate 1242 for cancellation. A generalization of such a scheme relies on a linear mapping, performed through a matrix multiplication, between the channel estimates 1232 and 1242 to a single channel estimate, which is then transformed to the frequency domain by an appropriate FFT operation inside the module 1280. The module 1280 provides frequency domain coefficients 1282 to the FEQ 1290.

Certain preferred embodiments preferably perform a linear transformation between the plurality of channel estimates to a single channel estimate, $$c = Ac_{BS} \tag{37}$$

where, $$c_{BS} = \begin{bmatrix} c_1 \\ c_2 \end{bmatrix} \tag{38}$$

is the stacking of the channel estimates in the general case, and shown in equation (37) for two channel estimates. The matrix A is the linear combination matrix which maps from the multiple channel estimates to a single channel estimate c. An example of such a matrix may be, $$A = [1\ -g] \tag{39}$$

where g is a complex value determined for each iteration of the channel estimation process 1230 and 1240. The variable g may be a magnitude scaling of for example, $$g_{max} = c_1^H c_2 \tag{40}$$

A maximum interference mitigation is achieved when $g = g_{max}$, but if the similarity between the channels is high, then the desired base station power may be insufficiently small following interference mitigation. Applying the linear transformation in equation (36), with $g = g_{max}$, provides $$c^H c_1 = c_1^H c_1 - g_{max} c_2^H c_1 = c_1^H c_1 - |g_{max}|^2 \tag{41}$$

and, $$c^H c_2 = c_1^H c_2 - g_{max} c_2^H c_2 = g_{max}(1 - c_2^H c_2) \tag{42}$$

The interference mitigation offered by equations (36)-(39) and implemented in module 1280 offers a desirable level of performance for the condition of "channel diversity." This assumes that the similarity between the channels for each corresponding base station is not high. If channel similarities are high, as in the case of flat rural areas, then more robust operations preferably are implemented in module 1280. The described process provides desirable performance advantages for many practical implementations.

Figure 13:
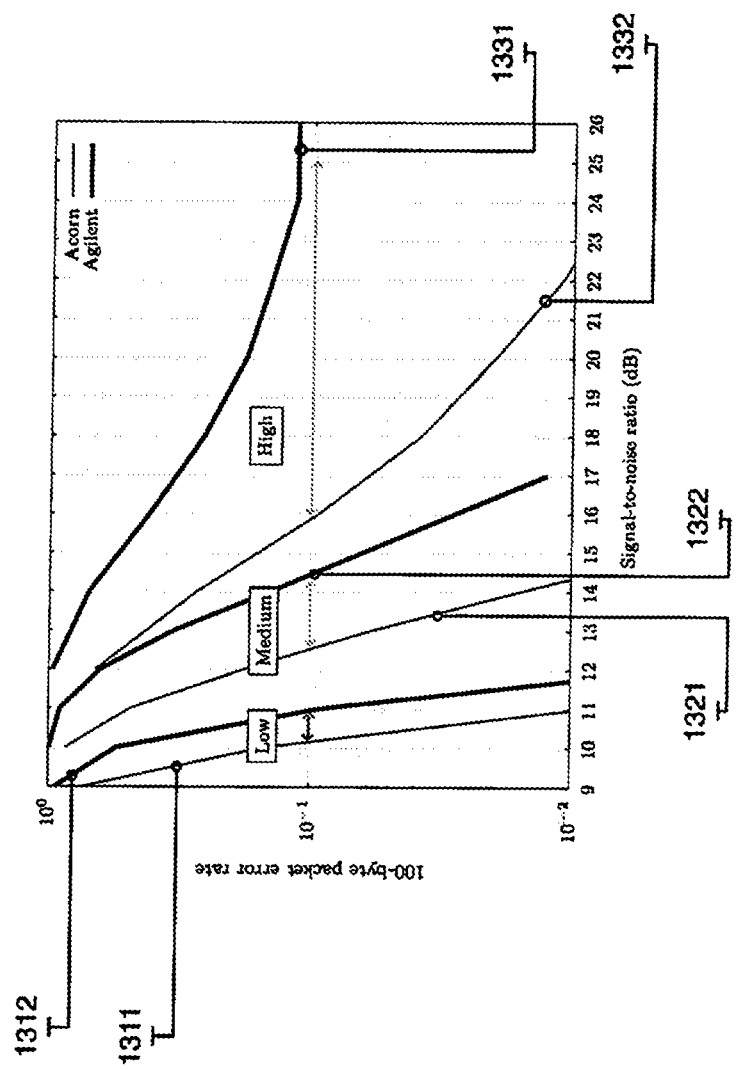
FIG. 13 graphically illustrates packet error rates observed in simulations of the performance of an implementation of the FIG. 12 OFDM receiver under different levels of interference.

Any interference mitigation or cancellation scheme performance relies on the channel estimation accuracy. The FIG. 12 implementation preferably exploits channel diversity, even when the second base station's channel is not estimated at the receiver. For two channels, with $|g_{max}| = 0.62$, FIG. 13 shows the improvement in packet-error rate in a WiMAX simulation at three power levels for the second base station. The implementation shown in FIG. 12, however, removes the calculations in 1240 and 1280 of the trivial case of g=0 given $|g_{max}| = 0.62$. The performance gains are presently believed to be associated with channel diversity and the accuracy of the LS-CE 1230. The performance curves 1311, 1321 and 1331 represent the performance with a preferred LS-CE 1230 in a WiMAX receiver. The performance curves 1312, 1322 and 1332 represent a generic WiMAX receiver with some prior knowledge about the desired base station's channel to calculate the channel estimate in the frequency domain, similar to the receiver shown in FIG. 11.

The present invention has been described in terms of certain preferred embodiments. Those of ordinary skill in the art will appreciate that various modifications and alterations could be made to the specific preferred embodiments described here without varying from the teachings of the present invention. Consequently, the present invention is not intended to be limited to the specific preferred embodiments described here but instead the present invention is to be defined by the appended claims.

I claim:

1. A receiver for orthogonal frequency domain multiplexing (OFDM) signals, comprising:
   an initial channel estimator that generates, responsive to one or more pilot subchannels within a received OFDM symbol comprising pilot and data subchannels, an initial time domain channel impulse response estimate of a channel determined solely from a time period over which the received OFDM symbol was transmitted;
   a time domain channel estimator coupled to receive the initial time domain channel impulse response estimate, the time domain channel estimator responsive to the initial time domain channel impulse response estimate to generate a further time domain channel impulse response estimate that more accurately characterizes the time domain channel over which the received OFDM symbol was transmitted; and
   a frequency equalizer responsive to the further time domain channel impulse response estimate to output an equalized signal responsive to the received OFDM symbol.

2. The receiver of claim 1, wherein the time domain channel estimator uses information about no more than one OFDM symbol to generate the further time domain channel impulse response estimate.

3. The receiver of claim 1, wherein the time domain channel estimator is further responsive to a plurality of pilot subchannels within the received OFDM symbol to generate the further time domain channel impulse response estimate.

4. The receiver of claim 3, wherein the time domain channel estimator determines an autocovariance matrix of at least a portion of a transmit signal and uses at least a portion of the autocovariance matrix to generate the further time domain channel impulse response estimate.

5. The receiver of claim 4, wherein the time domain channel estimator uses information about only one OFDM symbol to generate the further time domain channel impulse response estimate.

6. The receiver of claim 1, further comprising an interference canceller receiving a time domain channel impulse response estimate of an interference channel and canceling at least a portion of an interfering signal portion of a received input signal.

7. The receiver of claim 1, wherein the time domain channel estimator determines an autocovariance matrix corresponding to at least a portion of a symbol and uses at least a portion of the autocovariance matrix to generate the further time domain channel impulse response estimate.

8. The receiver of claim 1, wherein the initial channel estimator generates the initial time domain channel impulse response estimate by cross-correlating a received time domain signal with a time domain reference signal.

9. The receiver of claim 8, wherein the time domain reference signal comprises generated pilot signals and modulated zero value data signals.

10. A receiver for an orthogonal frequency domain multiplexing (OFDM) system, the receiver comprising:
- an initial channel estimator responsive to a plurality of pilots within a received OFDM symbol comprising pilots and data, the initial channel estimator generating an initial time domain channel impulse response estimate based on at least the plurality of pilots within the received OFDM symbol;
- a channel correction estimator that generates a time domain channel impulse response correction to the initial time domain channel impulse response estimate, the channel correction estimator responsive to the initial time domain channel impulse response estimate to generate a set of basis vectors and to generate the time domain channel impulse response correction as a combination of the set of basis vectors and a set of coordinates defined for the set of basis vectors;
- a channel adder that adds the initial time domain channel impulse response estimate with the time domain channel impulse response correction and generates a further time domain channel impulse response estimate; and
- a frequency equalizer responsive the further time domain channel impulse response estimate, the frequency equalizer equalizing a signal derived from the received OFDM symbol.

11. The receiver of claim 10, wherein the channel correction estimator is responsive to at least a portion of an autocorrelation matrix generated from a vector including a plurality of pilots from the received OFDM symbol as the channel correction estimator generates the time domain channel impulse response correction.

12. The receiver of claim 10, further comprising a reference signal generator that generates a time domain reference signal comprising pilot signals and modulated zero value data signals.

13. The receiver of claim 10, further comprising an interference canceller receiving a time domain channel impulse response estimate of an interference channel and canceling at least a portion of an interfering signal portion of a received input signal.

14. The receiver of claim 10, wherein the channel correction estimator receives an autocorrelation matrix based on channel statistics and generates the time domain channel impulse response correction in response to the initial time domain channel impulse response estimate and the autocorrelation matrix.

15. The receiver of claim 10, wherein the channel correction estimator uses information about a single OFDM symbol to generate the further time domain channel impulse response estimate.

16. The receiver of claim 10, wherein the channel correction estimator generates a vector from the initial time domain channel impulse response estimate to define a reduced dimension space, the channel correction estimator using the vector in generating the further time domain channel impulse response estimate.

17. A receiver for an orthogonal frequency domain multiplexing (OFDM) system, the receiver comprising:
- an initial channel estimator that generates, responsive to a received OFDM symbol, an initial time domain channel impulse response estimate of a channel determined solely from a time period over which the received OFDM symbol was transmitted;
- a channel correction estimator that receives the initial time domain channel impulse response estimate and generates a current time domain channel impulse response correction to a current time domain channel impulse response estimate in response to at least pilot subchannels within the received OFDM symbol;
- a channel estimator that adds a current time domain channel impulse response correction with a current time domain channel impulse response estimate and generates a further time domain channel impulse response estimate in an iterative process until a final time domain channel impulse response estimate is generated for the received OFDM symbol; and
- an equalizer that generates a frequency equalizer based on the final time domain channel impulse response estimate, the equalizer module equalizing a signal derived from the received OFDM symbol.

18. The receiver of claim 17, wherein the channel correction estimator is responsive to at least a portion of an autocorrelation matrix generated from a vector including a plurality of pilots as the channel correction estimator generates the current time domain channel impulse response correction in response to the initial time domain channel impulse response estimate.

19. The receiver of claim 18, wherein the initial channel estimator generates the initial time domain channel impulse response estimate by cross-correlating a received time domain signal with a time domain reference signal.

20. The receiver of claim 19, wherein the time domain reference signal comprises generated pilot signals and modulated zero value data signals.

21. The receiver of claim 17, wherein the final time domain channel impulse response estimate is a minimum error channel estimate in a least squares sense.

22. The receiver of claim 17, wherein the receiver uses information about a single OFDM symbol to generate the initial time domain channel impulse response estimate and the final time domain channel impulse response estimate.

* * * * *